Oct. 26, 1954

R. I. GARDNER 2,692,629

HYDRAULICALLY OPERATED FOOD DICER

Filed Oct. 9, 1950

Robert J. Gardner
INVENTOR.

BY
ATTORNEY

Oct. 26, 1954
R. I. GARDNER
2,692,629
HYDRAULICALLY OPERATED FOOD DICER
Filed Oct. 9, 1950
5 Sheets-Sheet 2
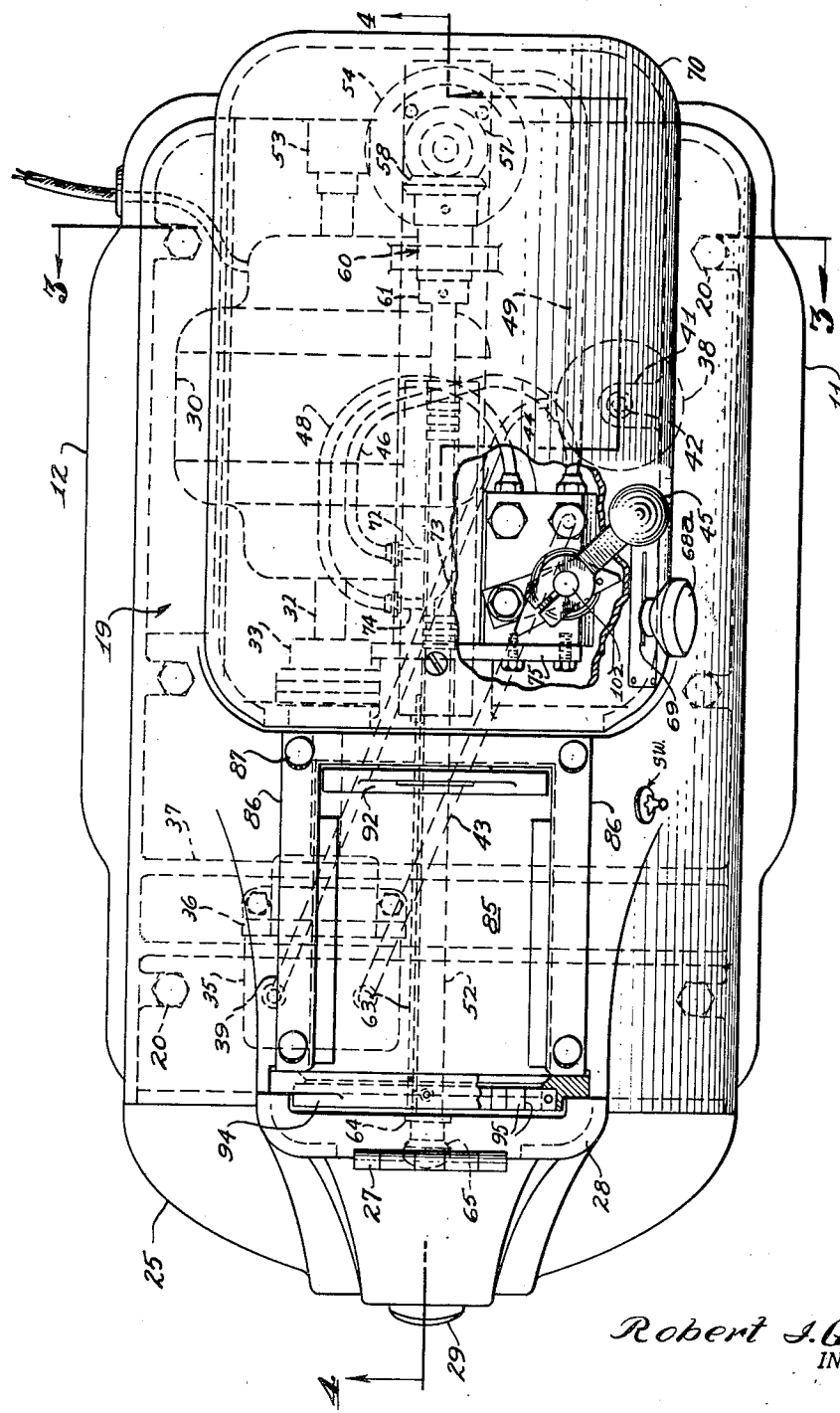
Fig. 2.
Robert I. Gardner
INVENTOR.
BY
ATTORNEY Oct. 26, 1954  R. I. GARDNER  2,692,629
HYDRAULICALLY OPERATED FOOD DICER
Filed Oct. 9, 1950  5 Sheets-Sheet 3

Robert J. Gardner
INVENTOR.

BY
ATTORNEY

Oct. 26, 1954 R. I. GARDNER 2,692,629
HYDRAULICALLY OPERATED FOOD DICER
Filed Oct. 9, 1950 5 Sheets-Sheet 5
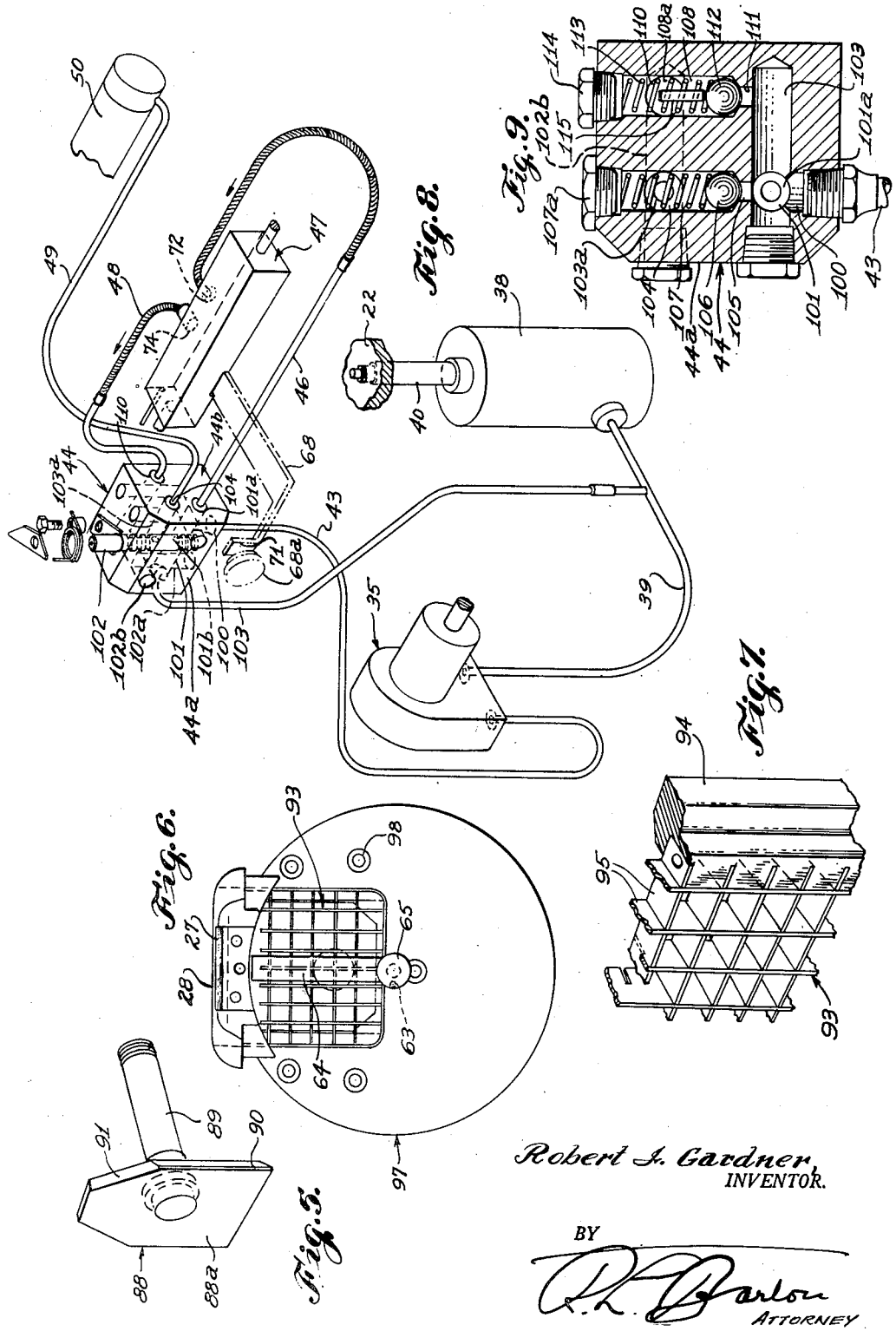
Robert I. Gardner,
INVENTOR.
BY Patented Oct. 26, 1954

2,692,629

UNITED STATES PATENT OFFICE 2,692,629

HYDRAULICALLY OPERATED FOOD DICER

Robert Irving Gardner, Los Angeles, Calif., assignor to Joseph W. O'Brien, Los Angeles, Calif.

Application October 9, 1950, Serial No. 189,097

8 Claims. (Cl. 146—78)

This invention relates to improvement in cutting machines for vegetable and other food substances such as potatoes, onions, carrots, lettuce and the like whereby the foods may be diced, sliced, and/or otherwise cut by forcing the food against and through a grill work of sharp cutting edges.

The machine of the present invention is more particularly intended to provide an improved machine of the kind described in Patent No. 2,341,582, dated February 15, 1944.

It should be understood, however, that while the present machine is primarily intended for cutting edible products, it may be used for cutting other substances requiring similar processing.

The machine described in the patent above referred to is a machine for cutting edibles in which a member is advanced in a step by step fashion by a manually operated means to force the edible material against a cutting grid mounted at one end of a material container provided in a housing in which the mechanism of the machine is contained. The mechanism includes a thrust or pusher head mounted in the container and a rotatable shaft on which is mounted a knife sweeping over the outer surface of the grid and cutting off the material extruded through the grid between forward movements of the pusher head.

It is an object of the present invention to provide a hydraulically operated cutting machine in which the means forcing the material against the grid may be operated in a step by step manner or in an uninterrupted movement.

It is a further object to provide valve means controlling the pressure fluid flow to a hydraulic cylinder operating the means pushing the material against the cutting grid so that the pusher member may be advanced by a succession of movements of a desired extent determined by the setting of said valve means.

Since the machine of this invention is commonly used for producing diced vegetables, a knife is provided which is swept over the exterior of the cutting grid at frequent intervals to shear off the material extruded through the grid, and since extrusion should not occur during the shearing movement of the knife, it is another object to provide a hydraulically operated machine having control means so arranged that when the machine is set for intermittent feed of material through the grid, the knife is swept over the grid during the momentary pauses between each step of the feeding movement, and the valve means cannot be set to provide an uninterrupted feed of the material, such as is required to produce "shoe string" potatoes, until the knife has been put out of action.

Another object is to provide a silently operating hydraulic system for a machine of the kind described which will be free from noisy chattering or squealing of the valves necessarily incorporated in the system.

Still another object is to provide a cutting machine capable of producing the cut material in slices, string form, or diced in various sizes, the controls of the machine being extremely simple and the construction of the machine being strong and compact.

Still further objects and features of this invention will appear from the following description read with reference to the accompanying drawings which illustrate an embodiment of the invention now in practice and at present considered preferable by me.

In the accompanying drawings:

Fig. 2 is a top plan view of the machine, with a portion of the housing broken away to show interior parts.

Fig. 5 is a perspective view of a thrust head.

Fig. 6 is a front view of a cover plate mounted over the front of the upper end of the machine.

Fig. 7 is a fragmentary perspective view on an enlarged scale of the grid shown in Fig. 6.

Fig. 8 is a diagrammatic drawing of the hydraulic circuit of the machine.

Fig. 9 is a cross section on line 9—9 of Fig. 2 drawn on a larger scale and showing relief and check valves fitted in a valve block.

Fig. 10 is a detail perspective view drawn on a larger scale of a segmental valve member.

Figure 3:
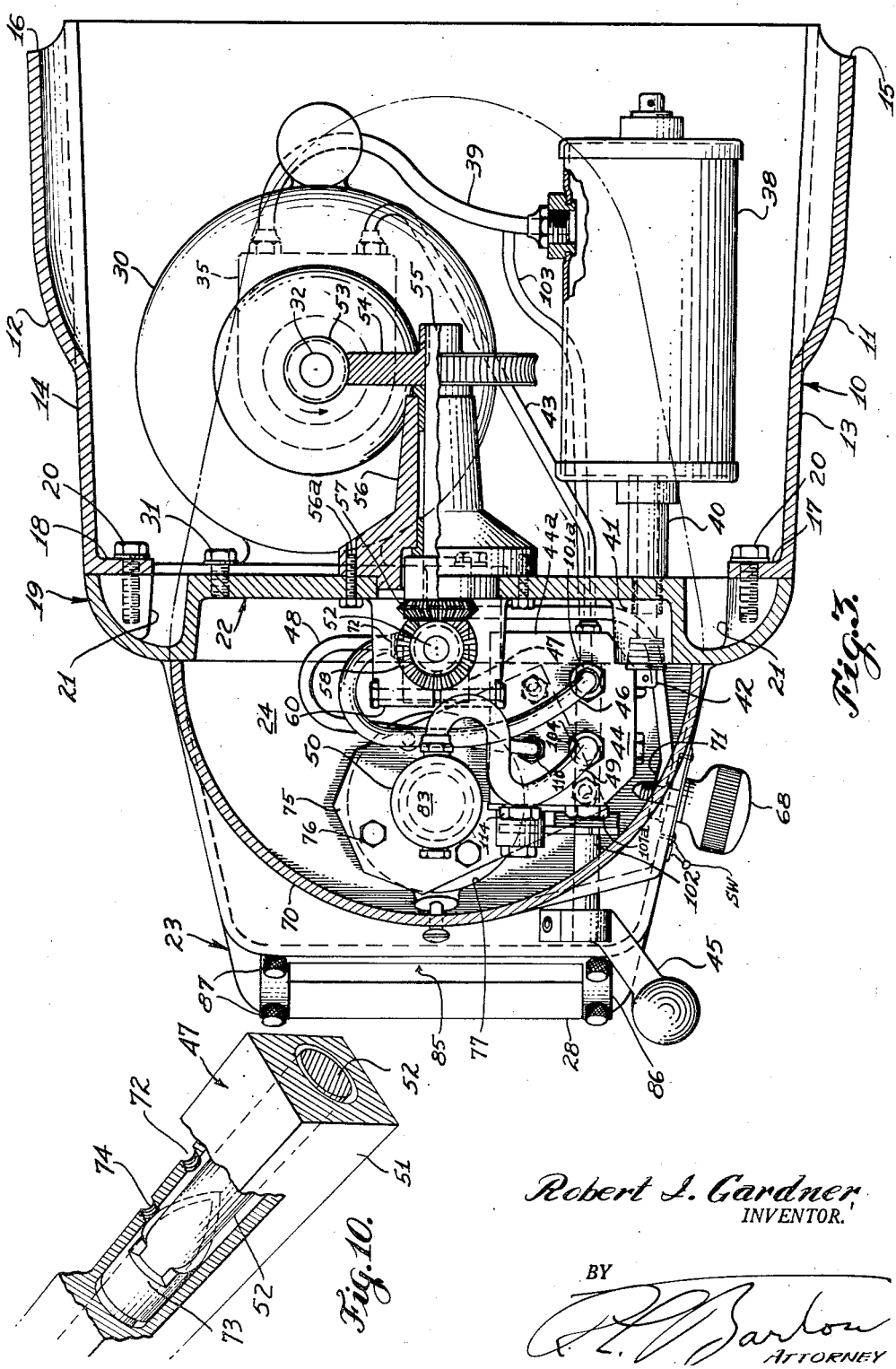
Fig. 3 is an enlarged cross section on line 3—3 of Fig. 2.

Referring now to Fig. 3 of the drawings the numeral 10 indicates the base of the machine. The base is generally of elongated, rectangular box like form open at top and bottom. The open bottom of the base rests upon a table counter or other surface, not shown, ventilation being provided by outwardly bowed sections 11 and 12 of the side walls 13 and 14, the lower edges of the sections being carried to slightly above floor level as indicated at 15 and 16. The upper edges of the side walls of the base are formed with inturned flanges 17, 18.

An upper housing assembly 19 is mounted on the base by cap screws 20 passing through holes in the flanges 17 and 18 and engaging in threaded holes in bosses 21 cast with the upper housing assembly. The upper housing is formed to provide a horizontal bed plate 22 at its rear portion and is upswept at its forward end, as indicated at 23. The upswept portion of the upper housing is provided with a transverse wall 24 spaced from its forward end which end is formed to provide a vertical rectangular opening. A rounded sheet metal cover 25 (Fig. 2) covers the vertical front end of the upper housing and is hinged at its upper edge at 27 to a transverse bar 28 extending across the top of the opening at the front of the upper housing and forming part of the upper housing assembly. A knob 29 is fitted to the cover 25 by which it may be lifted to expose the front end of the upper housing. It will be noted that the cover is spaced considerably away from the front of the upper housing to enable processed foods to fall from the front of the upper housing assembly which contains the dicing or cutting elements and operating elements therefor now to be described. The cut food is deflected outwardly in its fall by a forwardly curved surface 26 formed on the base.

Figure 4:
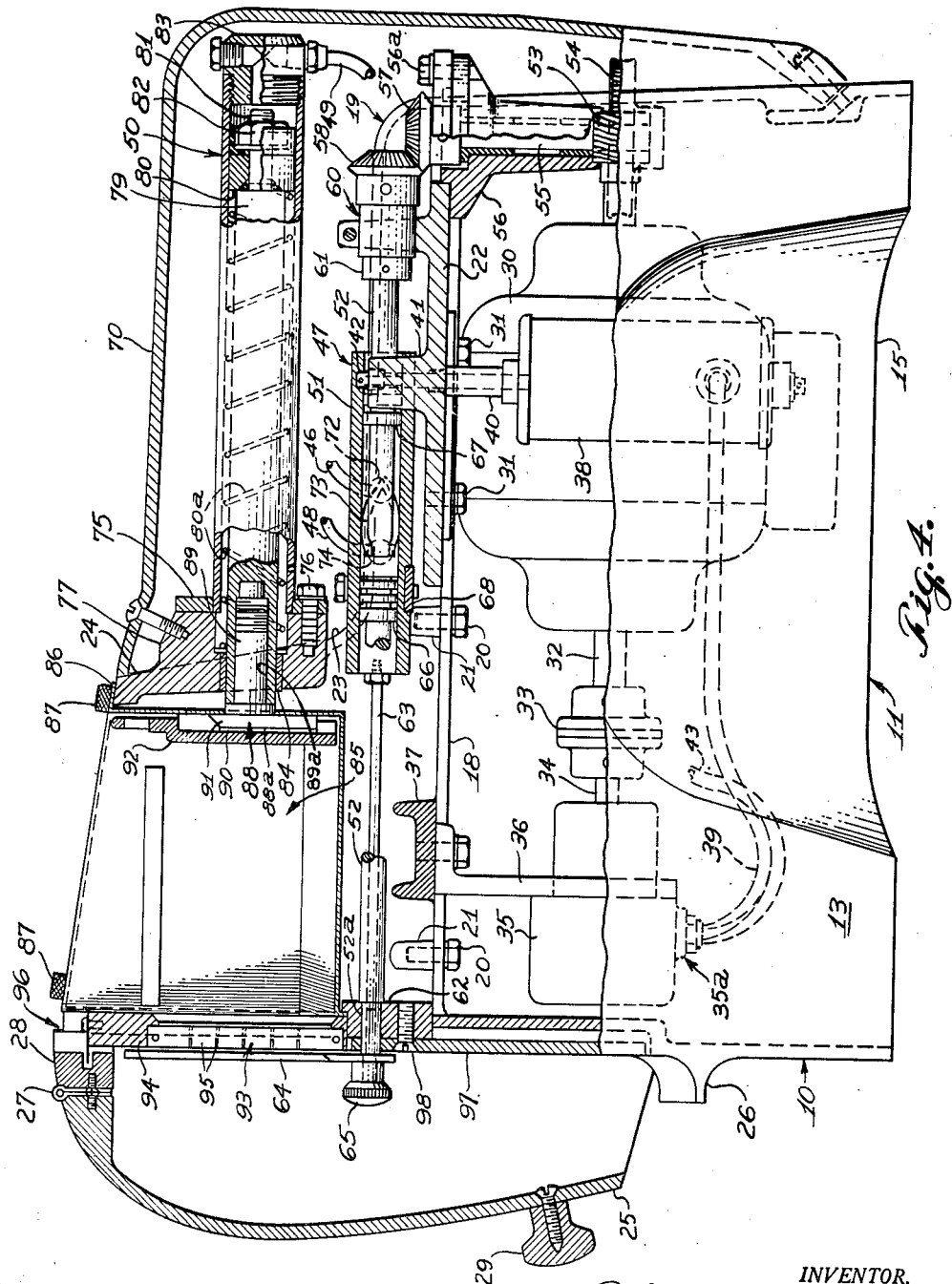
Fig. 4 is a longitudinal section on line 4—4 of Fig. 2.

Power for the machine is furnished by an electric motor 30, Fig. 4, suspended by bolts 31 from base plate 22. The shaft 32 of the motor is connected through flexible coupling 33 to the drive shaft 34 of a constant displacement pump 35 which is mounted on a bracket 36 secured to a transverse brace or channel member 37 forming part of the upper housing assembly.

The pump is connected to a reservoir 38 through pipe 39. The reservoir is suspended from base plate 22 in vertical position by a threaded nipple 40 screwed into a tubular boss 41 cast with the base plate 22, the bore of boss 41 being closed by a threaded plug 42 which may be removed to add hydraulic fluid to the reservoir when required.

The liquid discharged by the pump flows through pipe 43 to a control valve body 44 fitted with a control lever 45, the arrangement of the valves in the body 44 will be later described with reference to Fig. 9. The control valve body is provided with interior passages which, when the machine is operating on material, passes liquid through pipe 46 to a timing valve assembly generally indicated at 47 and back to the control valve body through pipe 48. A pipe 49 conducts the pump output from the valve body 44 to a hydraulic cylinder 50 which operates parts acting on the food being processed as later described.

The timing valve assembly 47 comprises a rectangular bar like body 51 having a longitudinal bore therethrough and slidably mounted on a shaft 52 which functions both to rotate a valve element within the valve body and to rotate a cutting element, both of which are later described.

The shaft 52 is rotated by motor 30 through a worm 53 on the shaft 32 of the motor and engaging with a worm gear 54 mounted on a vertical shaft 55 mounted in a pedestal bearing 56 secured to the bed plate 22 by cap studs 56a. The motor may be conveniently of one quarter horse power running at 1800 R. P. M. but the worm and worm gear provides a larger reduction in speed of rotation of shaft 55 to about 120 R. P. M.

A bevel gear 57 is pinned to the upper end of shaft 55 the sleeve of the gear serving to support the shaft in the pedestal bearing and engaging with a bevel gear 58 pinned to the rearward end of the shaft 52 which is carried horizontally on the base 22 by a back bearing 60 mounted on the bed plate, the shaft being held against longitudinal movement therein by a collar 61 pinned to the shaft and engaging one side face of bearing 60, and the sleeve of gear 58 which engages against the opposite side face of the bearing. The forward end of the shaft 52 is supported in a bearing 62 in the front wall of the upper housing. A knife 64 in the form of an arm having a sharpened cutting edge and a plate like butt end is removably mounted on the shaft by grinding a flat on the reduced end of the shaft and turning down a coaxial end portion and screwthreading it. The butt of the knife is machined with an opening fitting snugly on the reduced end 52a of the shaft 52 and is held thereon by a screw threaded knob 65 which is screwed onto the threaded end of the reduced portion of shaft 52.

The shaft 52 passes through a bore in body 51 which is of sufficiently greater diameter than the shaft to provide a fluid passage between the inner surface of the bore and the surface of the shaft, the annular space being closed off by spaced collars 66 at the forward end with O rings of resilient material held between the collars and affording a close sliding fit with the surface of the bore, and a similar collar and O ring arrangement 67 at the rearward end of the enclosed space. The timing valve body is longitudinally adjusted on shaft 52 by a flat bar 68, Fig. 8, fitted into a slot in the valve body and moved backwardly or forwardly by means of a knob 68a having a stem projecting through a slot 69 in a cover 70 extending over the rear portion of the machine, the knob being secured to an upwardly bent end 71 of the flat bar 68.

A port 72 is provided in the side of the valve body 51 and communicates with the fluid space therein. Pipe 46 is connected to this port, the pipe being wholly or in part made of flexible construction so that it may readily follow the movement of the valve body. Port 72 is at all times unobstructed.

Mounted forwardly of port 72 is a tapered segmental valve member 73 (Fig. 10), formed as a sleeve surrounding the shaft at the forward end of the segmental valve, the sleeve being gradually tapered to a point at its rearward end. The flexible pipe 48 is connected between valve body 44 and a port 74 in the timing valve body 51 and fluid flowing through the fluid space therein from port 72 to port 74 is returned to valve body 44 through pipe 48 and through interior passages therein is directed to pipe 49 through which it is supplied to the rear end of the single acting hydraulic cylinder 50. It is to be noted that port 72 is continuously open but that the amount of longitudinal adjustment which may be given to the timing valve body is such that port 74 may be closed for a portion of each rotation of shaft 52 by the segmental valve 73, the duration of closing being dependent on the length of the segment of solid portion of the segmental valve rotating across and closing the port, to the cut away portion of the valve at that point permitting liquid to flow through the port. A rod 63 is mounted at the forward end of the timing valve body and projects parallel to shaft 52 and through a hole in the front end of the upper housing assembly into engagement with the butt portion of the knife.

The hydraulic cylinder 50 (Figs. 3 and 4) is welded to a mounting plate 75 secured by studs 76 to a boss 77 cast on the transverse wall 24 of the upper housing assembly. The valve body 44 is also secured to the mounting plate 75. A rod 79 is mounted in the cylinder and is fitted at its rearward end with a follower or head 80 secured on a threaded extension 81 of reduced diameter of the rod and secured thereon by a nut 82, the rod extension projecting beyond the nut and acting as a stop spacing the follower from a plug 83 closing the rearward end of cylinder 50, the plug being bored and tapped for attachment of pipe 49 and to conduct liquid to the back of the follower 80. A return spring 80a is arranged between the forward end of the cylinder and the forward face of follower 80. The forward end of rod 79 projects through a bearing 84 in wall 24 into a food material compartment 85 in the form of an open top receptacle of sheet material open at its forward end and suspended by out turned flanges 86 which are supported on the margin of a cut in the top of the upper housing and secured in position by threaded studs 87. A thrust head 88 (Fig. 5) comprising a plate 88a secured to a stem 89 is positioned in the material compartment and attached to rod 79, the end of which is drilled as indicated at 89a to provide a hole to receive the stem 89. Said hole is threaded at its inner end and the threaded end of the stem is screwed into the threaded end of the hole. Plate 88 has vertical side edges 90 which are beveled rearwardly and the upper ends of the side edges are preferably inwardly inclined as indicated at 91.

A clean out and pusher head 92 in the form of a thick plate slotted at its rear is slipped over the pusher head, the undercut edges of which engage in the slot in the plate and securely retain the clean out head in position. The formation of the front face of the clean out head will be later referred to.

Figure 1:
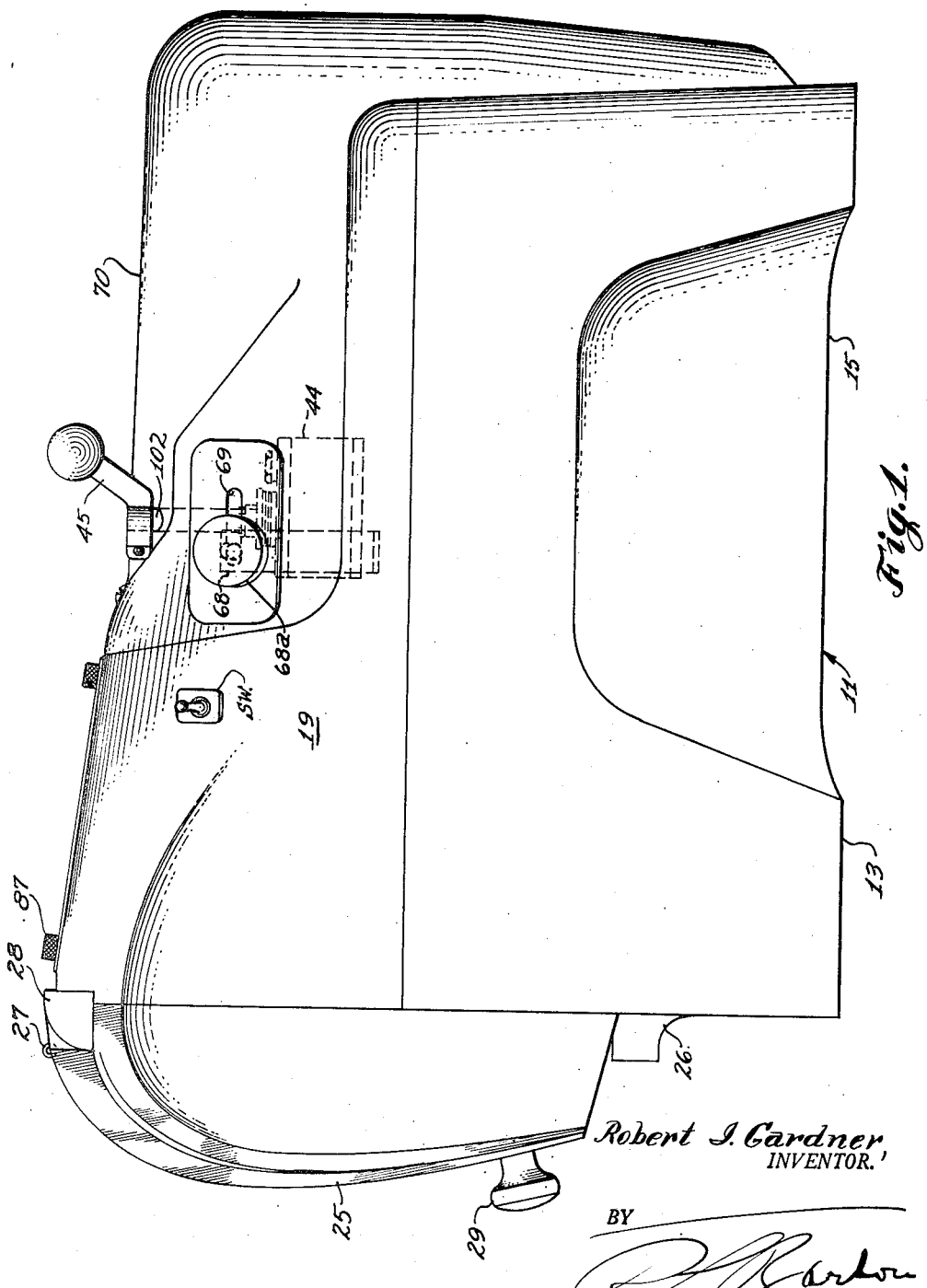
Fig. 1 is a side elevation of the food dicing machine of the improved invention.

A cutting grid 93, Figs. 1, 6 and 7, formed as a rectangular frame 94 having interfitting blades 95 consisting of horizontal and vertical flat blades or strips with their rear edges sharpened and fitted at their ends into slots in the frame and secured therein to form a rigid member which is inserted into slots 96 provided at the front of the upper housing assembly. The front of the upper housing assembly around the grid is covered by plate 97 secured by machine screws 98 secured in tapped holes in the upper housing member. The plate is provided with a hole for passage of shaft 52 and with a hole for passage of the rod 63. The plate 97 is cast integral with the bar 28 to which the front cover 25 is hinged.

It is to be understood that the cutting grid may be arranged in a variety of forms such as one with the blades closely spaced to produce small diced products or with more widely spaced blades to produce larger diced pieces, or may have the blades running in one direction only as for instance to shred cabbage or slice onions. The machine is produced with a variety of cutting grids which may be readily interchanged. The clean out head is formed with a front face scored so that the head when pushed against the grid will fit into the spaces between the blades of the grid and push out all the material cut by the blades and thereby leave the grid clean after each operation. It will be also understood that a number of clean out heads are provided each matching a corresponding grid.

As previously stated the material may be forced through the cutting grid by a series of intermittent progressive forward movements or by an uninterrupted forward movement of the clean out head which of course operates also as the pressure applying element or pusher.

The duration of each of the series of forward movements is effected by adjusting the timing valve 47 while the power exerted by the clean out head and pusher is adjusted by the setting of a spring loaded check valve in the valve body 44, and overload damage is prevented by a pressure release valve also arranged in the valve body the arrangement of which will now be described as far as is necessary to explain the arrangement of said check valve and pressure release valve.

Referring now to Fig. 9 the vertical passage 100 in the valve body 44 is connected to the outlet port 35a of the pump. Passage 100 connects with a first horizontal passage 101 parallel to the face 44a of the valve body leading in one direction to a port 101a, Fig. 8, to which pipe 46 conducting the hydraulic fluid to the timing valve inlet port 72 is attached, the horizontal passage 101 extending in the opposite direction to a rotatable valve plug 102 on which the control lever is mounted having a first through bore 101b alined with the horizontal passage 101 which terminates in a second vertical passage 102a communicating with a port to which a pipe 103 leading to the reservoir 38 is connected. A second horizontal passage 103a in the same vertical plane as the first horizontal passage 101 but above it connects the vertical passage 100 in one direction with a port 104 to which is connected the pipe 49 leading pressure fluid to the hydraulic cylinder 50, the passage 103a leading in the opposite direction in the valve body through a second through hole in the valve plug 102 to the vertical passage 102a connected to the pipe 103. Between the two horizontal passages 101 and 103a vertical passage 100 is constricted as shown at 105 to provide a seat for a ball 106 loaded by a spring 107 held under compression by a plug 107a closing vertical passage 100.

A vertical passage 108 spaced from vertical passage 100 but in the same vertical plane parallel to face 44b of valve body 44 is connected thereto by passage 103 below check valve 106 and a horizontal passage 108a connects with the passage 103, the horizontal passage 108a terminating at one end in port 110 to which pipe 48 from the outlet port 74 of the timing valve is connected, and at its opposite end connects through passage 102b with the passage 102a connected to the reservoir. Intermediate the length of vertical passage 108 a constriction 111 is formed providing a valve seat for the ball 112 of a pressure release valve loaded by a spring 113 placed under adjustable compression by a threaded plug 114 closing the end of passage 108. To reduce chattering of pressure release valve a short length of rod 115 is rested upon the ball 112 and by its inertia prevents the ball being put into vibration at a steady rate which would cause a loud squeal.

In operation, when the motor 30 has been started by switch SW and the valve plug 102 is in its normally open position to which it is biased by a torsion spring 116 acting on the lever 45, the pump 25 will deliver liquid to passage 100, this liquid will flow through the passage 101 and back to the reservoir 38, but when the lever 45 is held in operative position in which the passages in the plug are out of registration with the passages leading to the passage connected to the reservoir, the fluid flows to the timing valve 47 and through it, during the period in each revolution of shaft 52 that its outlet port 74 is open, and back to the reservoir 38, but during the period that the timing valve outlet port 74 is closed in each revolution of shaft 52, the liquid forces its way past the check valve 106 and flows into the cylinder 50 through port 104 thus advancing the pusher and clean out head 92 by a series of steps until stopped by full engagement with the cutting grid 93.

The rotation of shaft 52 which is driven at the same time as the pump 35, rotates knife 64, thus continuously cutting off the material projected through the cutting grid 93, but the material being forced through the grid is relieved of pressure while the knife 64 is passing over the grid. This result is obtained by alining the knife and segmental valve 73 so that the outlet port 74 of the timing valve 47 is open when the knife commences its shearing function at all settings of the timing valve 47.

It is to be understood that the stop rod 63 will abut the butt of the knife before the timing valve can be placed in the fully closed position unless the knife is first removed. As shown in Fig. 4 stop rod 63 is shown in retracted position.

When the motion of the thrust head and clean out and pusher head 92 mounted on the thrust head is arrested, the pressure fluid from the pump 35 will force its way past the pressure relief valve 112 until the operator releases control lever 45 which will enable spring 116 to return the operating valve plug 102 to open position enabling the spring 80a to return the follower 80 to initial position and to withdraw the thrust head 88 and clean out and pusher head mounted thereon for another operation. Fluid from behind the follower 80 will be returned to the reservoir 38 through pipe 75 and the passages 103a, 102a through the valve body and valve plug 102.

The timing valve is set to cause shorter or longer strokes of the pusher head by moving knob 68.

If it is desired to produce "shoe string" potatoes or the like the knife is removed from the forward end of the operating shaft and knob 68 moved to the forward end of its travel.

If sliced vegetables such as cabbage are to be produced, the grid and clean out head are changed for ones provided with parallel spaced cutting blades in the grid and corresponding slots in the head, the valve setting being made to give an uninterrupted forward movement of the head, the knife 64 having been first removed from shaft 52.

The base and upper housing assembly together provide a housing for all operative parts of the machine and with the covers provided over the front and back and most of the top of the machine provide a completely enclosed and easily cleaned machine.

It will be evident that I have provided a simple and effective cutting machine of wide usefulness, but it is to be understood that the scope of my invention is not limited by the embodiments illustrated in the drawings but only as intended to be defined by the scope of the appended claims.

I claim:

1. In a machine for cutting food and other substances having a housing, a container within the housing for the substance to be cut and a cutting grid at one end of the container; a hydraulic cylinder mounted in the housing, a follower in said cylinder and a rod secured to the follower, thrust and pusher means arranged in said container and connected to said rod and operated thereby to force the substance to be cut against the cutting grid, a source of fluid under pressure, valve means arranged within the housing and controlling the flow of pressure fluid to the hydraulic cylinder, a rotatable shaft mounted in the housing, a motor mounted within the housing; drive means between the motor and said shaft effective to rotate the latter during the cutting operation of the machine, means associated with and actuated by rotation of said shaft for controlling the thrust and pusher means to selectively actuate the latter in an intermittent movement, a knife removably mounted in position to sweep over the outer face of the cutting grid, said knife being rotated by said shaft, and manually operated means for adjusting said valve means to deliver predetermined equal amounts of fluid to the cylinder at each revolution of said shaft to thereby automatically advance the thrust and pusher means in an intermittent continuously forward manner until said thrust and pusher means are stopped by said grid.

2. In a machine for cutting food and other substances having a housing, a container within the housing for the substance to be cut and a cutting grid at one end of the container; a hydraulic cylinder mounted in the housing, a follower in said cylinder and a rod secured to the follower, thrust and pusher means arranged in said container and connected to said rod and operated thereby to force the substance to be cut against the cutting grid, a source of fluid under pressure, valve means arranged within the housing and controlling the flow of pressure fluid to the hydraulic cylinder, a rotatable shaft mounted in the housing, a motor mounted within the housing; drive means between the motor and said shaft effective to rotate the latter during the cutting operation of the machine, an elongated, bored valve body adjustably mounted longitudinally on said shaft and affording a passage for pressure fluid between the surface of the shaft and the inner surface of the valve body, and in fluid tight relation to said shaft at the ends of said passage, spaced ports in said valve body for the inlet and outlet of pressure fluid to and from said passage, a segmental valve member of continuously longitudinally varying circumferential extent fixed co-axially on said shaft, said segmental valve member having an uninterrupted circumferential surface at one end, manually operated means mounted on the housing to adjust said valve body relatively to the shaft to cut off flow through one of said ports at times and to secure an interrupted flow through said port at other times dependent on the adjustment of the valve body, a passage in said valve means conducting pressure fluid to the cylinder when flow of fluid through the elongated valve body is cut off, and a knife removably mounted on and rotated by said shaft in position to sweep over the outer face of the cutting grid.

3. A machine as set forth in claim 2 and in which said knife comprises a flat butt portion, a rod mounted on the adjustable valve body and adapted to abut said butt portion of the knife to prevent adjustment of the longitudinal valve body into position to completely arrest flow of pressure fluid therethrough unless the knife is first removed from position.

4. In a machine for cutting food and other substances having a housing, a container within the housing for the substance to be cut and a cutting grid at one end of the container; a hydraulic cylinder mounted in the housing, a follower in said cylinder and a rod secured to the follower, thrust and pusher means arranged in said container and connected to said rod and operated thereby to force the substance to be cut against the cutting grid, an electric motor mounted in the housing, a pump driven by said motor, a liquid reservoir mounted in the housing and piping through which liquid is drawn by the pump, supplied under pressure to the hydraulic cylinder and returned to the reservoir, a rotatable shaft mounted in the housing and driven by the motor, manually operated valve means arranged within the housing and controlling the flow of pressure fluid from the pump to the hydraulic cylinder, a rotatable shaft mounted in the housing, gear means for rotating said shaft from the motor during the cutting operation of the machine, a member connected with and actuated by the rotation of said shaft operative to control the thrust and pusher means to selectively cause the latter to move in intermittent steps, and a knife removably mounted on and rotated by said shaft to sweep over the outer face of the cutting grid.

5. In a machine for cutting food and other substances having a housing, a container within the housing for the substance to be cut and a cutting grid at one end of the container; a hydraulic cylinder mounted in the housing, a follower in said cylinder and a rod secured to the follower, thrust and pusher means arranged in said container and connected to said rod and operated thereby to force the substance to be cut against the cutting grid, a source of fluid under pressure, a rotatable shaft mounted in the housing, a motor within the housing and drive means for rotating said shaft from said motor, a control valve through which the pressure fluid is first conducted, a timing valve effective at times to interrupt the flow of pressure fluid to secure a step by step operation of the thrust and pusher means in a continuously forward direction until stopped by the cutting grid and effective at other times to prevent the flow of pressure liquid through the timing valve, a passage through said control valve directing fluid to the hydraulic cylinder when flow of fluid through the timing valve is prevented to effect a constant travel of the thrust and pusher means, manually operated means for adjusting the timing valve a manually operated control member mounted on the housing for admitting pressure fluid to and shutting it off from said control valve, and a knife removably mounted and rotated by said shaft in position to sweep over the outer face of the cutting grid.

6. A machine as set forth in claim 1 and in which a passage is provided in said valve means for escape of pressure fluid after the thrust and pusher means have contacted the cutting grid, a spring loaded pressure release valve mounted in said passage, and weight means resting on said pressure release valve.

7. A machine as claimed in claim 5 wherein said timing valve comprises an axially elongated projection at an end thereof varying in width longitudinally of the shaft.

8. A machine as claimed in claim 5 wherein said timing valve comprises an element having a tubular part mounted about the shaft and a segmental part projecting longitudinally of the shaft with its width varying axially of the shaft.

References Cited in the file of this patent

UNITED STATES PATENTS

| Number | Name | Date |
|---|---|---|
| 733,976 | Lacour et al. | July 21, 1903 |
| 1,369,202 | Stoltenberg | Feb. 22, 1921 |
| 1,611,244 | Schmidt | Dec. 21, 1926 |
| 1,668,286 | Powell | May 1, 1928 |
| 1,794,833 | Castellucci | Mar. 3, 1931 |
| 2,141,428 | Carroll | Dec. 27, 1938 |
| 2,299,092 | Johnson | Oct. 20, 1942 |
| 2,318,142 | Cox et al. | May 4, 1943 |
| 2,341,582 | Turner | Feb. 15, 1944 |
| 2,479,080 | Orrell | Aug. 16, 1949 |
| 2,485,653 | Peel | Oct. 25, 1949 |

FOREIGN PATENTS

| Number | Country | Date |
|---|---|---|
| 674,181 | Germany | Apr. 6, 1939 |